(12) United States Patent
Donval et al.

(10) Patent No.: US 9,223,157 B2
(45) Date of Patent: Dec. 29, 2015

(54) REFLECTIVE OPTICAL LIMITER (75) Inventors: Ariela Donval, Rosh Haayin (IL); Yuval Ofir, Modiin (IL); Doron Nevo, Ra'anana (IL); Moshe Oron, Rehovot (IL)

(73) Assignee: KiloLambda Technologies Ltd., Tel Aviv (IL)

( * ) Notice: Subject to any disclaimer, the term of this patent is extended or adjusted under 35 U.S.C. 154(b) by 0 days.

(21) Appl. No.: 14/343,922

(22) PCT Filed: Sep. 12, 2012

(86) PCT No.: PCT/IB2012/054749
§ 371 (c)(1),
(2), (4) Date: Mar. 10, 2014

(87) PCT Pub. No.: WO2013/042013
PCT Pub. Date: Mar. 28, 2013

(65) Prior Publication Data
US 2014/0233085 A1    Aug. 21, 2014

Related U.S. Application Data (60) Provisional application No. 61/537,260, filed on Sep. 21, 2011.

(51) Int. Cl.
G02F 1/01    (2006.01)
G02F 1/19    (2006.01)

(52) U.S. Cl.
CPC ............... G02F 1/0147 (2013.01); G02F 1/19 (2013.01); *G02F 2201/50* (2013.01); *G02F 2202/30* (2013.01); *G02F 2203/52* (2013.01)

(58) Field of Classification Search
USPC ......... 359/288, 321, 240, 241, 262, 265, 266, 359/272, 275, 361, 619, 622, 626, 885, 359/861; 252/582, 583, 586; 372/21; 349/20, 21, 161, 184
See application file for complete search history.

(56) References Cited

U.S. PATENT DOCUMENTS 7,960,029 B2    6/2011    Kai et al.
8,478,087 B2    7/2013    Farber et al.
(Continued)

FOREIGN PATENT DOCUMENTS

EP    1 467 239    10/2004
WO    WO 2009/156816    * 12/2009
WO    WO 2010/141168 A1    12/2010

OTHER PUBLICATIONS

International Search Report mailed Jan. 24, 2013 which issued in corresponding International Patent Application No. PCT/IB2012/54749 (4 pages).
(Continued)

*Primary Examiner* — Tuyen Tra
(74) *Attorney, Agent, or Firm* — Nixon Peabody LLP

(57) ABSTRACT

An optical limiter comprises a glass backing, a glass cover, and a layer of a phase changing material placed between said glass backing and said glass cover, the phase changing material comprising a transparent matrix having embedded particles of material that changes its optical properties due to temperature induced phase change of said material. The optical properties may change from transparent to reflective, from transparent to refractive or from transparent to scattering. The phase changing material is preferably at least one material selected from the group consisting of the elements Antimony, Bismuth, Cadmium, Lead, Tin and Indium and low-melting-point alloys of two or more of these elements. Two or more layers of phase changing materials may be used in a stack configuration, with each of the phase changing materials having a unique melting temperature.

17 Claims, 5 Drawing Sheets (a)

(b)

(56) References Cited

U.S. PATENT DOCUMENTS

| | | |
|---|---|---|
| 8,559,094 B2 * | 10/2013 | Bae et al. .................. 359/288 |
| 2010/0166368 A1 | 7/2010 | Oron et al. |
| 2011/0051231 A1 | 3/2011 | Donval et al. |
| 2011/0170159 A1 | 7/2011 | Donval et al. |

OTHER PUBLICATIONS

International Written Opinion mailed Jan. 24, 2013 which issued in corresponding International Patent Application No. PCT/IB2012/54749 (5 pages).

Aithal et al: "Optical Limiting Due to Frequency Up-Converted Fluorescence in DASPB Dye Doped Polymer Matrix", Proceedings of SPIE, vol. 4797, (Feb. 14, 2003), pp. 229-239.

Dhanuskodi et al: "Optical Limiting Behavior of Certain Thiourea Metal Complexes Under CW Laser Excitation", Current Applied Physics, North-Holland, Amsterdam, NL, vol. 11, No. 3, (Dec. 13, 2010), pp. 860-864.

Sarkar et al: "Multifunctional Composite Materials for Optical Power Limiting Applications in Space Environments", Journal of Nanophotonics, vol. 3, No. 031890, (Nov. 5, 2009), pp. 1-14.

Extended European Search Report for Application No. EP 12 83 3781.3, mailed May 7, 2015 (8 pages).

* cited by examiner

REFLECTIVE OPTICAL LIMITER

CROSS REFERENCE TO RELATED APPLICATIONS

This application is a U.S. national stage of International Application No. PCT/IB2012/054749, filed Sep. 12, 2012, which claims priority to U.S. Provisional Patent Application Ser. No. 61/537,260, filed Sep. 21, 2011, each of which are incorporated herein by reference in their entirety.

FIELD OF THE INVENTION

The present invention relates to optical power-limiting devices, and more particularly, to an optical power-limiting passive device and to a method for limiting optical power transmission in lenses and windows, using reflectivity changes in particles of a low-melting-point material embedded inside an optical element. These particles change their light reflectivity, refraction or scattering properties when passing from solid to liquid states, in a transparent matrix.

BACKGROUND OF THE INVENTION

Optical limiters are devices designed to have high transmittance for low-level light inputs and low transmittance for high power light inputs. Since the development of the first lasers, passive optical limiters have been researched and concepts have been tested to protect optical sensors against laser peak-power induced damage. The first optical limiters for CW lasers were based on thermal lensing in absorbing bulk liquids, i.e., local heating in an imaging system reduced the index of refraction of the limiting material, causing "thermal blooming" and resulting in a beam that was no longer focused. Other methods have been suggested for limiting pulsed laser sources such as reverse saturable absorption, two-photon and free carrier absorption, self-focusing, non-linear refraction and induced scattering. The limiting device itself must also possess a high threshold against damage, and not get into a state where it is "bleached-out" by high power or turning transparent by high power.

Communications and other systems in medical, industrial, and remote sensing applications, may handle relatively high optical powers, from microwatts up to several watts, in single fibers or waveguides. With high intensities (power per unit area) introduced into these systems, many thin film coatings, optical adhesives, and even bulk materials, are exposed to light intensity beyond their damage thresholds. Another problem is laser safety, wherein there are well-defined upper power limits allowed to be emitted from fibers into the open air. These two issues call for a passive device that will limit the amount of energy propagating in a fiber/waveguide to the allowed level.

There have been many attempts to realize optical limiters, mainly for high power laser radiation, high power pulsed radiation, and eye safety devices. The techniques used in these devices have been mainly:

1. Thermal change of the index of refraction n, in liquids having negative dn/dT, for defocusing the light beam, e.g., in an imaging system.
2. Self-focusing or self-defocusing, due to high electric field-induced index of refraction n change, through the third order susceptibility term of the optical material, here $n=n_0+n_2 E^2$ where $n_0$ is the index of refraction at zero electric field (no light), $n_2$ is the non-linear index change and E is the electric field strength of the light beam.
3. Colloidal suspensions of absorbers in both polar and non-polar solvents that limit by the creation of plasma and induced scattering.
4. Non-linear nanostructures and materials, that are highly scattering when exposed to high light intensities. These materials show low thresholds due to field enhancement and nano-particle dimensions.

Both No. 1 and 2 of the above-mentioned techniques require very energetic laser beams or light intensities to produce a meaningful limitation. In the first technique, the volumes of liquid to be heated are large and need high powers. Another problem with this technique is that the liquid is not a good optical medium and distorts the beam. In the second technique, the $n_2$ coefficient is very small for usable materials and requires very high electric fields.

In the third technique, the use of liquids is problematic for most applications. In a communications system, for instance, the use of liquids in a passive device causes noise and distortion from turbulence of the liquid in the optical path. Other problems reported using the colloidal liquid as an optical-limiting medium include aging either by disappearance of the active material or the formation of flocs of loosely bound large particles that break up only after ultrasonic deflocculation. Some work has been done on using liquid crystals as limiting material, mainly for high power pulses, but these materials cause noise and distortion worse than ordinary liquids due to directional fluctuations.

The use of nanostructures having various nanoparticles in a solid matrix for limiting devices is described in Israeli patent 147554 and EP 1467239 A2 (uses nanostructures for limiting through scattering).

There is a constant need for low-threshold limiters, mainly for protection from strong light sources.

SUMMARY OF THE INVENTION

In accordance with one embodiment, an optical limiter comprises a glass backing, a glass cover, and a layer of a phase changing material placed between said glass backing and said glass cover, the phase changing material comprising a transparent matrix having embedded particles of material that changes its optical properties due to temperature induced phase change of said material. The optical properties may change from transparent to reflective, from transparent to refractive or from transparent to scattering. The phase changing material is preferably at least one material selected from the group consisting of the elements Antimony, Bismuth, Cadmium, Lead, Tin and Indium and low-melting-point alloys of two or more of these elements. Two or more layers of phase changing materials may be used in a stack configuration, with each of the phase changing materials having a unique melting temperature. Optically transparent inter-layers, such as polymeric material, glass, spin-on glass and a sol-gel material, may separate the layers of phase changing materials.

In one implementation, the layer of a phase changing material includes a layer of a composite material comprising a matrix material and dispersed micro/nanoparticles of a phase changing material that changes its properties from transparent to mat or scattering. The phase changing material may be patterned in the micro/nanoscale.

In one embodiment, the present invention provides a low-threshold optical limiting system based on reflectivity changes in solder material particles embedded inside an optical element. These particles change their light reflectivity, refraction or scattering properties when passing from solid to liquid states, in a transparent matrix.

It is a broad object of the present invention to provide an optical power-limiting device and a method for limiting power transmission, which uses a novel way of limiting, allowing very low thresholds. This optical power-limiting device can offer the following advantages and properties:
1. The operation of the limiter is passive; no external power is required.
2. The device operates for many cycles (e.g., thousands), limiting at high input powers and returning to its original, non-limiting state when the input power is lowered or shut off.
3. The device may be activated by a wide range of wavelengths, e.g., visible and IR ranges. It may have small differences in materials and dimensions to fit the desired spectral range.
4. The device withstands high intensities, a few (e.g., ×10) times higher than the limiting threshold.
5. The device has relatively fast (e.g., in the microseconds region and below) response, limited by the direct and indirect heating time of minute volumes.
6. The device has high spectral transmission (e.g., 1-2 dB insertion loss) at intensities well below the power limit.

In one implementation, an optical limiter comprises a layer of a phase changing material placed between a glass or polymer transparent backing and a glass or polymer transparent cover, where the phase changing material is a transparent matrix having embedded particles of a material that changes its optical properties due to phase change of the embedded particles.

In another implementation, an optical limiter comprises a patterned layer of a phase changing material placed between a glass or polymer transparent backing and a glass or polymer transparent cover, where the phase changing material is a transparent matrix having embedded particles of a material that changes its optical properties due to phase change of the embedded particles, the patterned layer creating an optical grating.

In another implementation, an optical limiter comprises a layer of a phase changing material placed between a glass or polymer transparent backing and a glass or polymer transparent cover, where the transparent matrix is polymethylmethacrylate, polyurethane, polycarbonate, polyvinylbutyral, epoxy resins, thiol-ene based resins, optical adhesives, glass, spin-on glass or a sol-gel material.

In another implementation, an optical limiter comprises a patterned layer of a phase changing material placed between a glass or polymer transparent backing and a glass or polymer transparent cover, where the transparent matrix is polymethylmethacrylate, polyurethane, polycarbonate, polyvinylbutyral, epoxy resins, thiol-ene based resins, optical adhesives, glass, spin-on glass or a sol-gel material, the patterned layer creating an optical grating.

In another implementation, an optical limiter comprises a layer of a phase changing material placed between a glass or polymer transparent backing and a glass or polymer transparent cover, where the phase changing material is of, e.g., 1-100 nm particles of at least one material selected from the group consisting of the elements Antimony, Bismuth, Cadmium, Lead, Tin and Indium and low-melting-point alloys of two or more of these elements.

In another implementation, an optical limiter comprises a patterned layer of a phase changing material placed between a glass or polymer transparent backing and a glass or polymer transparent cover, where the phase changing material is a transparent matrix having embedded nano/micro-spheres having an outer layer of transparent dielectric containing phase changing materials embedded in a transparent dielectric matrix where the size of the spheres can vary from a few nanometers in diameter to a few microns.

In another implementation, an optical limiter comprises multiple layers of a phase changing material placed between a glass or polymer transparent backing and a glass or polymer transparent cover, where the phase changing material is a transparent matrix having embedded particles of a material that changes its optical properties due to phase change of the embedded particles. Every layer of the multiple stack of layers has a different melting or phase change temperature.

In another implementation, an optical limiter comprises multiple layers of a phase changing material placed between a glass or polymer transparent backing and a glass or polymer transparent cover and an optically transparent interlayer material that contains an infra-red absorbing dye to reduce the threshold radiation.

In another implementation, an optical limiter comprises a layer of a phase changing material placed on top of a glass or polymer transparent backing where the phase changing material is a transparent matrix having embedded particles of a material that changes its optical properties due to phase change of the embedded particles.

In another implementation, an optical limiter comprises a layer of a phase changing material placed on top of a glass or polymer transparent backing where the phase changing material is a transparent solid layer of 1-100 nm thickness of at least one material selected from the group consisting of the elements Antimony, Bismuth, Cadmium, Lead, Tin and Indium and low-melting-point alloys of two or more of these elements.

In another implementation, an optical limiter comprises a layer of a phase changing material placed on top of a glass or polymer transparent backing where the phase changing material is a transparent matrix having embedded nano/micro-spheres having an outer layer of transparent dielectric containing phase changing material embedded in a transparent dielectric matrix where the size of the spheres can vary from a few nanometers in diameter to a few microns.

The present invention further concerns, but is not limited to, the production of smart windows, glasses and skylights, for green, energy efficient, housing construction. The invention also makes it possible to produce the limiter in the optical communication area, e.g., detector protection, switch and line protection, amplifier input signal limiting and equalizing and power surge protection. The invention also makes it possible to produce power regulation in networks, in the input or at the output of devices. In the areas of medical, military and laser machining, an optical power limiter may be used for surge protection and safety applications.

BRIEF DESCRIPTION OF THE DRAWINGS

The invention will be better understood from the following description of preferred embodiments together with reference to the accompanying drawings, in which.

DETAILED DESCRIPTION OF PREFERRED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
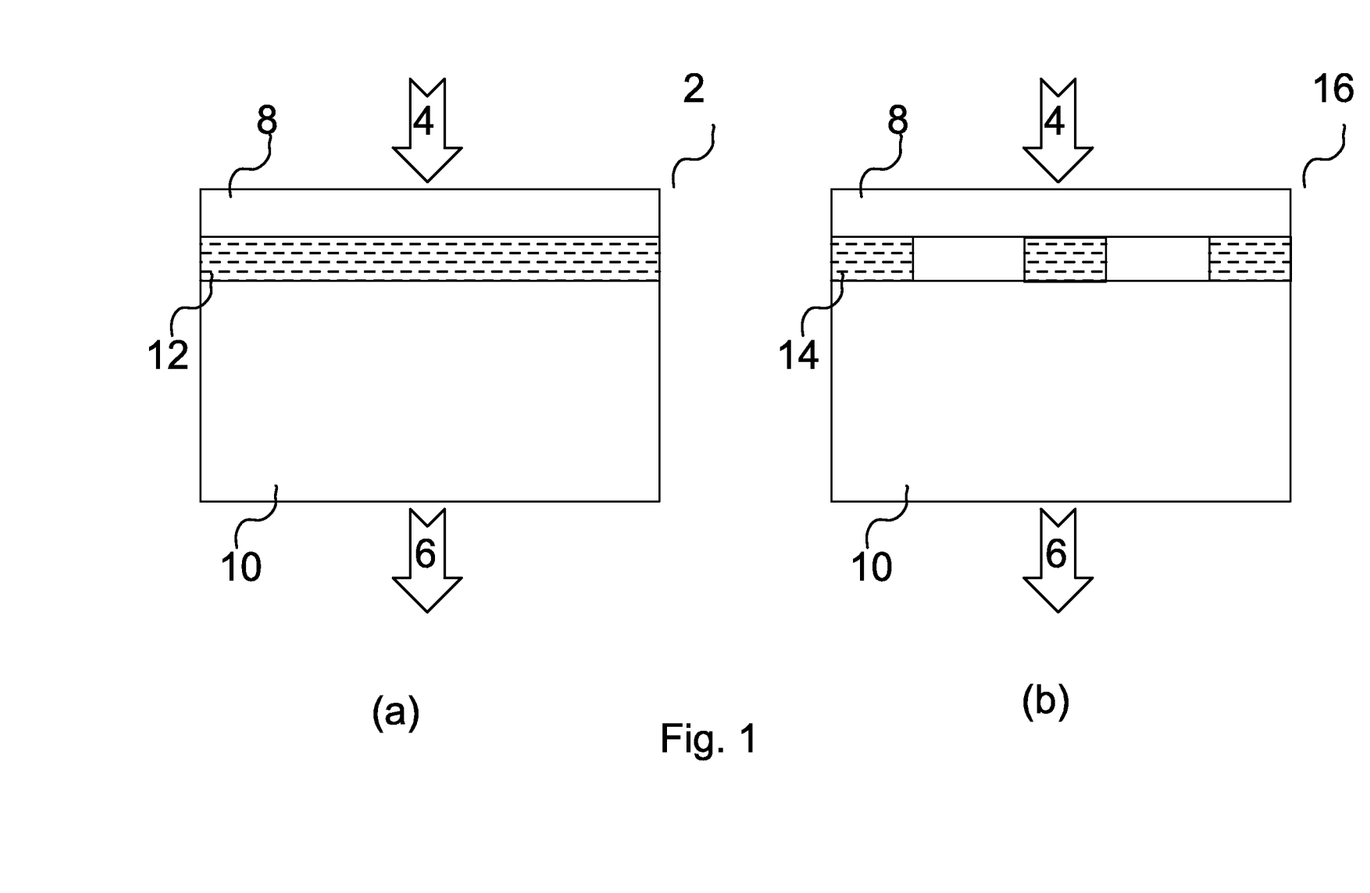
FIG. 1(a) is a schematic view of an optical limiter comprising a layer of a phase changing material on a glass backing.
FIG. 1(b) is a schematic view of an optical limiter comprising a layer of a patterned phase changing material on a glass backing.

FIG. 1(a) shows a schematic view of an optical limiter 2 having a layer of phase changing material 12 placed between a glass backing 10 and a glass cover 8. The phase changing material 12 is a transparent matrix; having embedded particles of a material that changes its optical properties due to a phase change of the embedded particles. When light 4 impinges on the limiter 2 it passes through the transparent cover 8 and is partially absorbed in layer 12, either in the matrix or in the particles. The rise in temperature, due to light absorption, affects the phase of the embedded particles, changing them from solid to liquid, or from optically transparent to optically reflecting, refracting or scattering, thus making the whole limiter 2 partially transmitting. The intensity of the light exiting the limiter 6 is reduced from its original intensity. The optically transparent layers 8, 10, 12 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

FIG. 1(b) is a schematic view of an optical limiter 16 having a layer of patterned phase changing material 14 between a glass backing 10 and a glass cover 8. The phase changing material 14 is a transparent matrix; having embedded particles of material that changes its optical properties due to phase change of the embedded particles. When light 4 impinges on the limiter 2, it passes through the transparent cover 8 and is partially absorbed in layer 14 either in the matrix or in the particles. The rise in temperature, due to light absorption, affects the phase of the embedded particles, changing them from solid to liquid, or from optically transparent to optically reflecting, refracting or scattering, thus making the whole limiter 2 partially transmitting. The intensity of the light exiting the limiter 6 at 4 is reduced from its original intensity. The patterning of layer 14 can be used to manufacture gratings or planar lenses based on index of refraction change or phase change of material 14. The optically transparent layers 8, 10, 12 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

Figure 2:
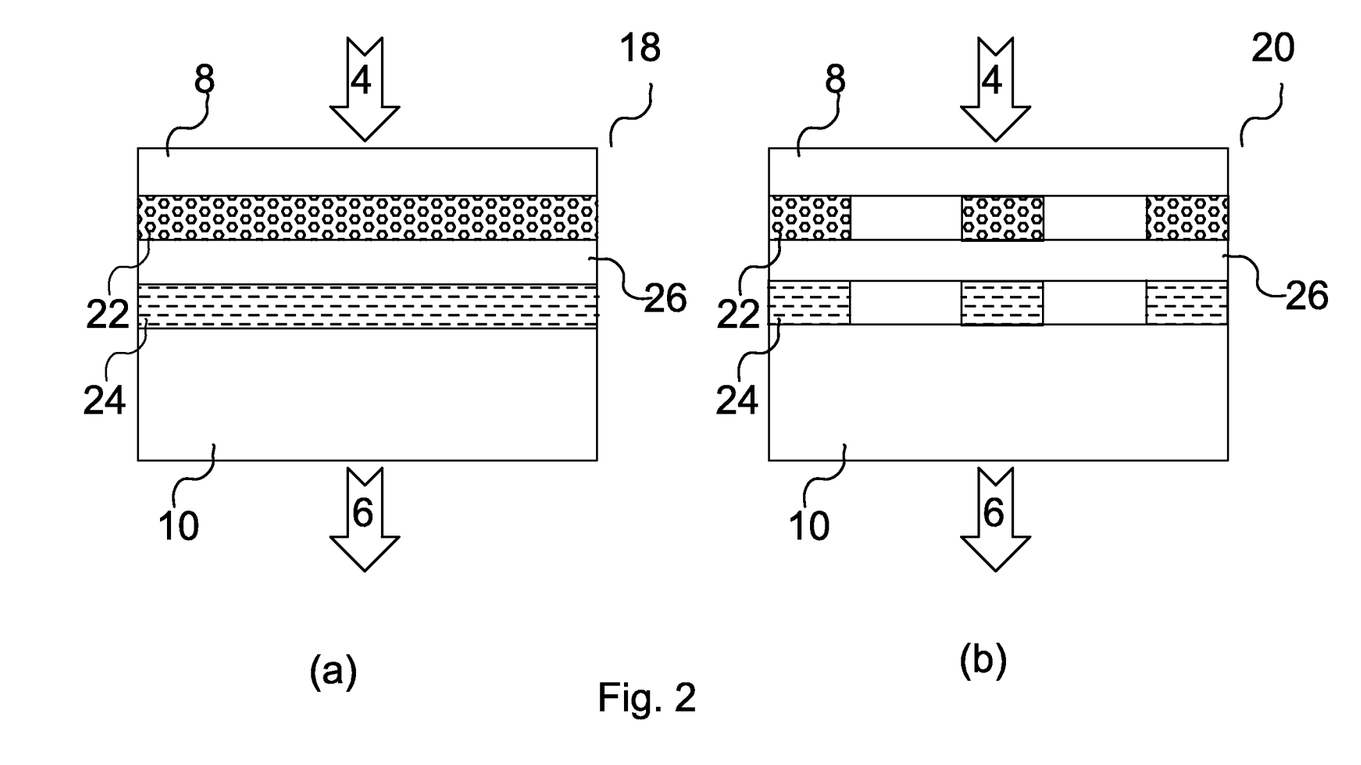
FIG. 2(a) is a schematic view of an optical limiter comprising dual layers of phase changing materials on a glass backing.
FIG. 2(b) is a schematic view of an optical limiter comprising patterned dual layers of phase changing materials on a glass or plastic backing.

FIG. 2(a) is a schematic view of an optical limiter 18 having a dual layer of phase changing materials 22 and 24 placed between a glass backing 10 and a glass cover 8, with a spacing 26 separating the two layers. The phase changing materials 22 and 24 are transparent matrices having embedded particles of material that changes its optical properties due to phase change of the embedded particles. The materials 22 and 24 change their properties at temperatures $t_1$ and $t_2$, respectively. The difference between $t_1$ and $t_2$ can allow a change in attenuation as a function of local or ambient temperature. When light 4 impinges on the limiter 2, it passes through the transparent cover 8 and is partially absorbed in layers 22, 24 either in the matrix or in the particles. The rise in temperature, due to light absorption, affects the phase of the embedded particles, changing them from solid to liquid, or from optically transparent to optically reflecting, refracting or scattering, thus making the whole limiter 18 partially transmitting. The intensity of the light exiting the limiter 6 at 4 is reduced from its original intensity. The optically transparent interlayer 26 can contain an infrared absorbing dye, for enhanced heating and reduction of the threshold radiation of the limiter 18. The optically transparent layers 8, 10, 22, 24 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

FIG. 2(b) is a schematic view of an optical limiter 20 having a patterned dual layer of a phase changing materials 22 and 24 placed between a glass backing 10 and a glass cover 8, with a spacing 26 separating the two layers. The phase changing materials 22 and 24 are transparent matrices having embedded particles of material that changes its optical properties due to phase change of the embedded particles. The materials 22 and 24 change their properties at temperatures $t_1$ and $t_2$, respectively. The difference between $t_1$ and $t_2$ can allow a change in attenuation as a function of temperature. When light 4 impinges on the limiter 20, it passes through the transparent cover 8 and is partially absorbed in layers 22, 24 either in the matrix or in the particles. The rise in temperature, due to light absorption, affects the phase of the embedded particles, changing them from solid to liquid, or from optically transparent to optically reflecting, refracting or scattering, thus making the whole limiter 20 partially transmitting. The intensity of the light exiting the limiter 6 at 4 is reduced from its original intensity. The patterning of layer 22 and 24 can be used to manufacture gratings or planar lenses based on index of refraction change or phase change of material 22 and 24. The optically transparent layers 8, 10, 22, 24, 26 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

Figure 3:
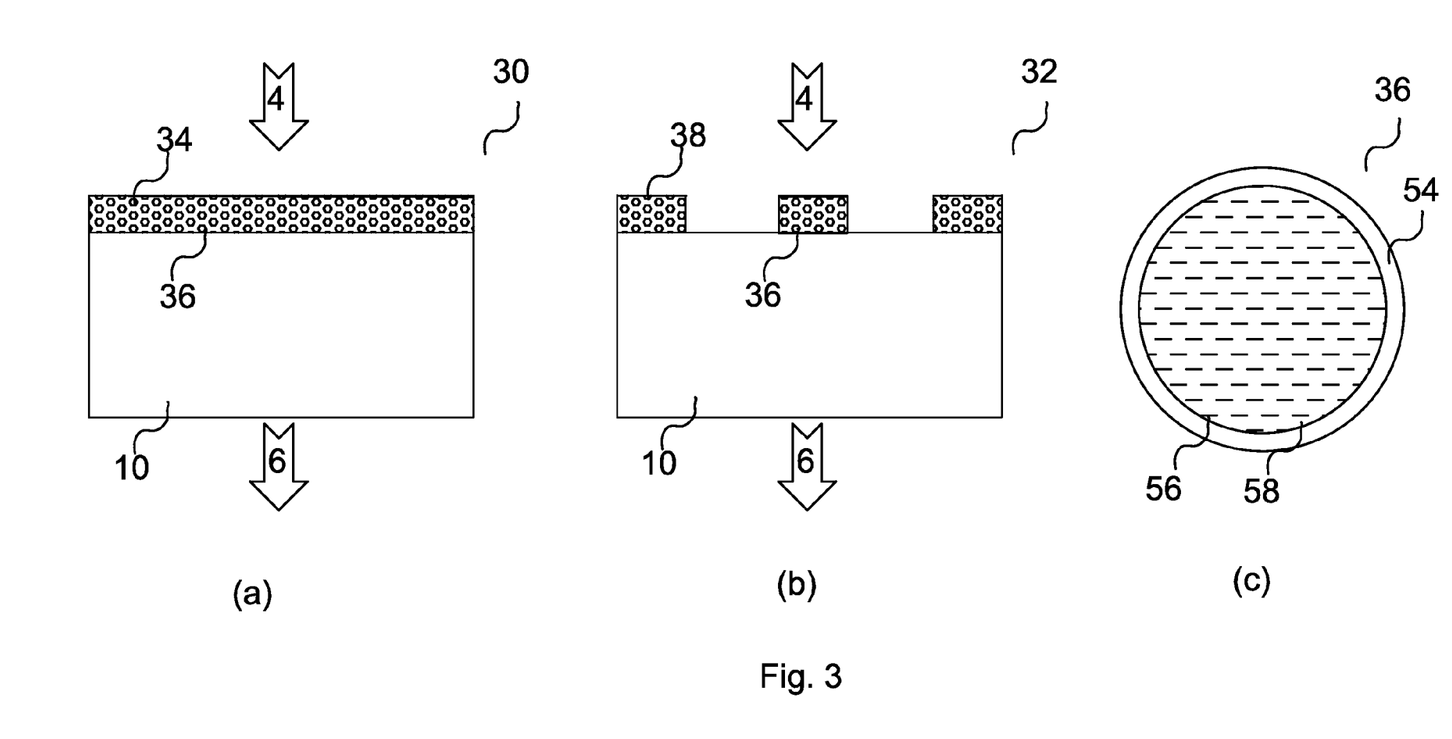
FIG. 3(a) is a schematic view of an optical limiter comprising a layer of composite materials comprising a matrix material and dispersed micro/nanoparticles of a phase changing material in it.
FIG. 3(b) is a schematic view of an optical limiter comprising a layer of a patterned composite materials comprising a matrix material and dispersed micro/nanoparticles of a phase changing material in it, on a glass or plastic backing.

FIG. 3(a) is a schematic view of an optical limiter 30 having a layer of composite materials 34 comprising a matrix material and dispersed micro/nano-spheres 36 having a phase changing material in it, on a transparent substrate 10. The micro/nano-spheres 36 are pre-prepared with the phase changing materials in them and then embedded into matrix 34. The nano/micro-spheres 36 are shown in FIG. 3(c), where an outer layer of transparent dielectric 54 contains phase changing materials 56 embedded in a transparent dielectric matrix 58, the size of the spheres can be from few nanometers in diameter to few microns. When light 4 impinges on the limiter 30 it is partially absorbed in layer 34 either in the matrix or in the micro/nano-spheres 36. The rise in temperature, due to light absorption, affects the phase of the embedded particles, changing them from solid to liquid, or from optically transparent to optically reflecting, refracting or scattering, thus making the whole limiter 30 partially transmitting. The intensity of the light exiting the limiter 6 at 4 is reduced from its original intensity. The optically transparent layers 10, 34, 58 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

FIG. 3(b) is a schematic view of an optical limiter 32 having a layer of a patterned of composite materials 38 comprising a matrix material and dispersed micro/nano-spheres 36 of a phase changing material in it, on a transparent substrate 10. Micro/nano-spheres 36 are pre-prepared with the phase changing materials in them and then embedded into matrix 38. The nano/micro-spheres 36 are shown in FIG. 3(c), where an outer layer of transparent dielectric 54 contains phase changing materials 56 embedded in a transparent dielectric matrix 58, the size of the spheres can be from few nanometers in diameter to few microns. When light 4 impinges on the limiter 32 it is partially absorbed in layer 38 either in the matrix or in the micro/nano-spheres 36. The rise in temperature, due to light absorption, affects the phase of the embedded particles, changing them from solid to liquid, or from optically transparent to optically reflecting, refracting or scattering, thus making the whole limiter 32 partially transmitting. The intensity of the light exiting the limiter 6 at 4 is reduced from its original intensity. The patterning of layer 38 can be used to manufacture gratings or planar lenses based on index of refraction change or phase change of material 36. The optically transparent layers 10, 38, 58 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

Figure 4:
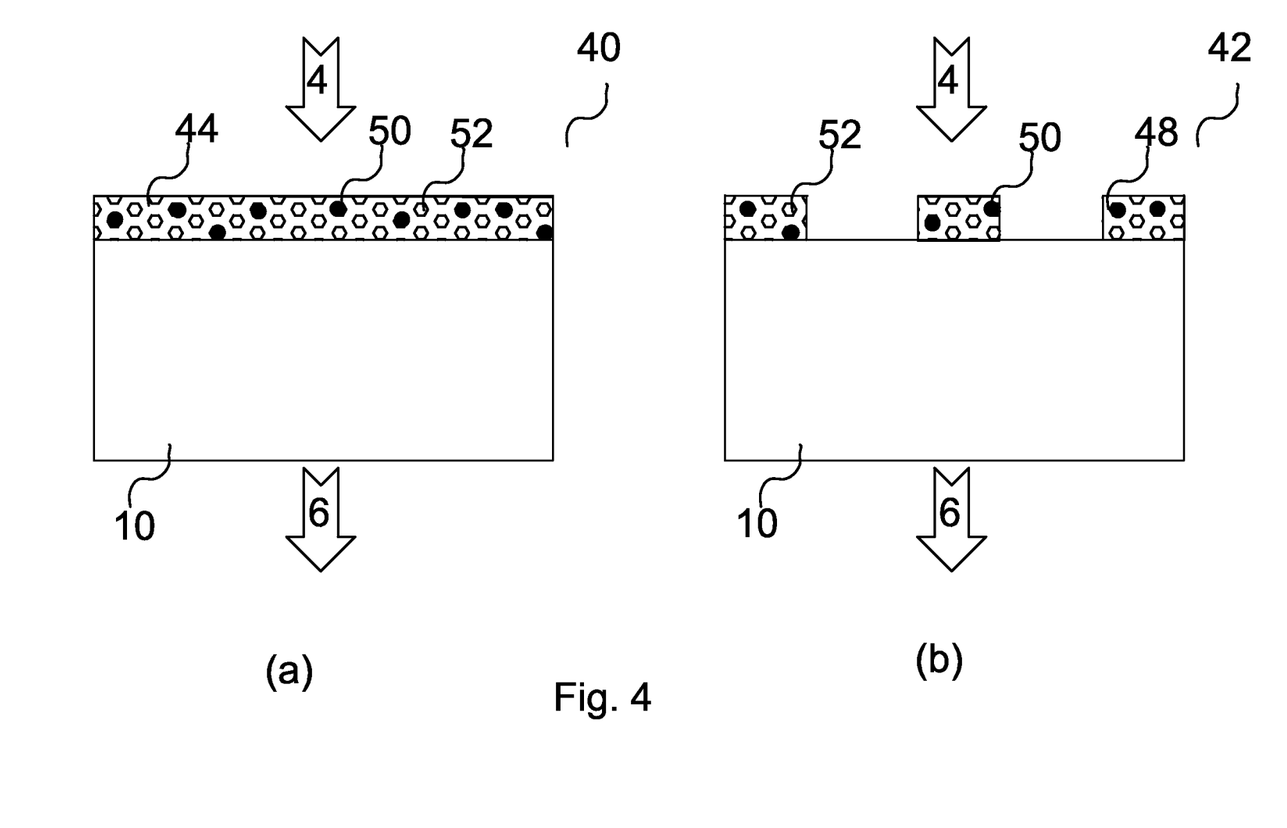
FIG. 4(a) is a schematic view of an optical limiter comprising a two layers of composite materials comprising a matrix material and dispersed micro/nanoparticles of a phase changing material in it.
FIG. 4(b) is a schematic view of an optical limiter comprising a two layer of a patterned composite materials comprising a matrix material and dispersed micro/nanoparticles of a phase changing material in it, on a glass or plastic backing.

FIG. 4(a) is a schematic view of an optical limiter 40 having a layer of composite material 44 comprising a matrix material and dispersed two or more kinds of micro/nano-spheres 50 and 52 of a phase changing material in it. The nano/micro-spheres 50, 52 are of the same kind shown in FIG. 3(c), as micro/nano spheres 36 where an outer layer of transparent dielectric 54 contains phase changing materials 56 embedded in a transparent dielectric matrix 58, the size of the spheres can be from few nanometers in diameter to few microns. The material in micro/nano-spheres 50 changes its properties at temperature $t_1$ and material in micro/nano-spheres 52 at temperature $t_2$, the difference between $t_1$ and $t_2$ can allow a change in attenuation as a function of local or ambient temperature. When light 4 impinges on the limiter 40 it is partially absorbed in layers 44 either in the matrix or in the particles. The rise in temperature, due to light absorption, affects the phase of the embedded particles 50 and 52, changing them from solid to liquid, refracting or scattering, or from optically transparent to optically refractive, reflective or scattering, thus making the whole limiter 40 partially transmitting. The intensity of the light exiting the limiter 6 at 4 is reduced from its original intensity. The optically transparent layers 10, 44 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

FIG. 4(b) is a schematic view of an optical limiter 42 having a patterned layer of composite material 48 comprising a matrix material and dispersed two or more kinds of micro/nano-spheres 50 and 52 of a phase changing material in it. The micro/nano-spheres 50, 52 are of the same kind shown in FIG. 3(c), as micro/nano spheres 36 where an outer layer of transparent dielectric 54 contains phase changing materials 56 embedded in a transparent dielectric matrix 58. The size of the spheres can be from few nanometers in diameter to few microns. The material in micro/nano-spheres 50 changes its properties at temperature $t_1$ and material in micro/nano-spheres 52 at temperature $t_2$, the difference between $t_1$ and $t_2$ can allow a change in attenuation as a function of local or ambient temperature. When light 4 impinges on the limiter 42 it is partially absorbed in layers 48 either in the matrix or in the particles. The rise in temperature, due to light absorption, affects the phase of the embedded particles 50 and 52, changing them from solid to liquid, or from optically transparent to optically reflecting, refracting or scattering, thus making the whole limiter 42 partially transmitting. The intensity of the light exiting the limiter 6 at 4 is reduced from its original intensity. The optically transparent layers 10, 48 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys. The optical power limiter 42 comprises a phase change material that upon absorption of light heats up and melts to become refractive, reflective or scattering. The patterning of layer 48 can be used to manufacture gratings or planar lenses based on the index of refraction change or phase change of materials 50 and 52.

Figure 5:
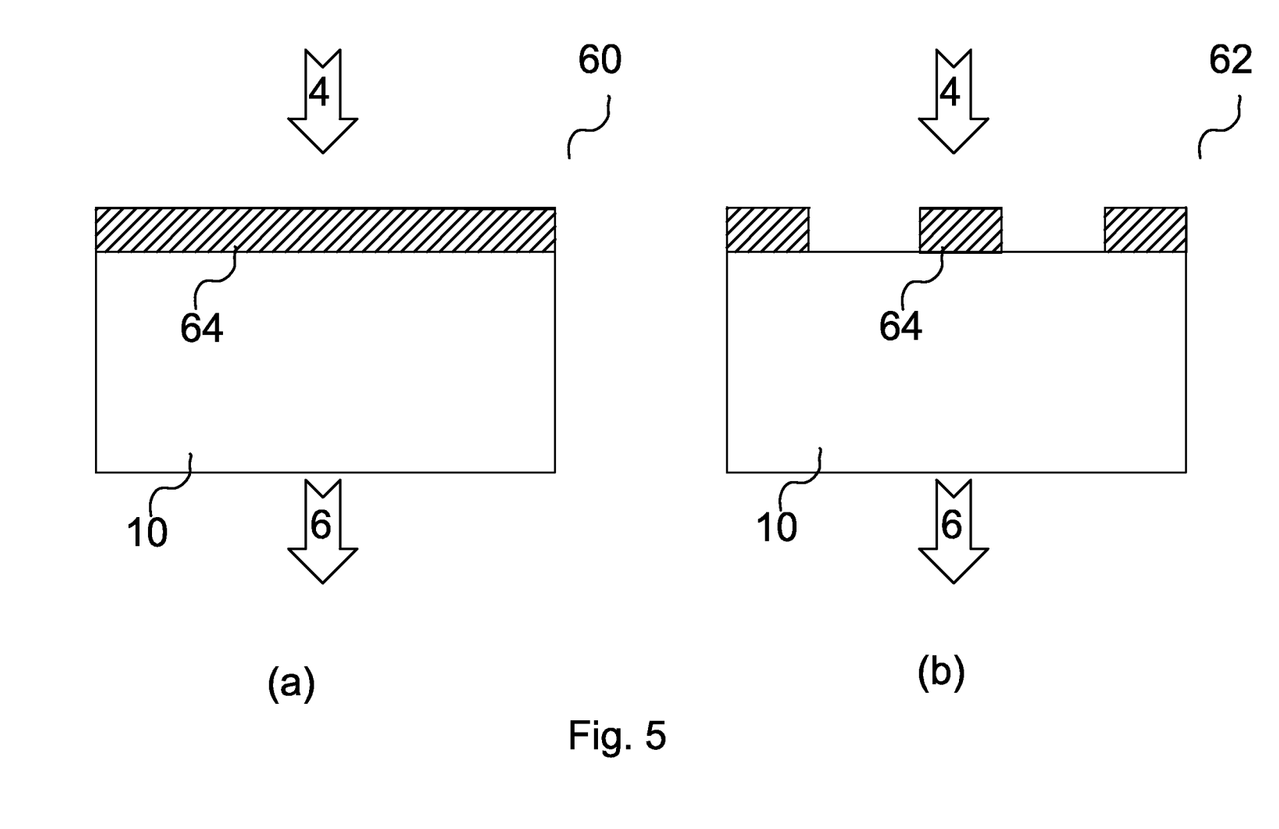
FIG. 5(a) is a schematic view of an optical limiter comprising of a thin solid layer of a phase changing material on a glass backing.
FIG. 5(b) is a schematic view of an optical limiter comprising of a thin solid layer of a patterned phase changing material on a glass backing.

FIG. 5(*a*) is a schematic view of an optical limiter 60 having a thin solid layer of a phase change material 64 on a glass backing 10. The phase changing material 64 is a thin, 1 to 100 nm thick, solid layer of material that changes its optical properties due to phase change. When light 4 impinges on the limiter 60 it is partially absorbed in layer 64. The rise in temperature, due to light absorption, affects the phase of the layer, changing them from solid to liquid, or from optically transparent to optically reflecting, refracting or scattering, thus making the whole limiter 60 partially transmitting. The intensity of the light exiting the limiter 6 at 4 is reduced from its original intensity. The optically transparent layer 10 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys.

FIG. 5(*b*) is a schematic view of an optical limiter 62 having a thin solid layer of a patterned phase changing material 64 on a glass backing 10. The phase changing material 64 is a patterned thin, 1 to 100 nm thick, solid layer of material that changes its optical properties due to phase change. When light 4 impinges on the limiter 60, it is partially absorbed in the layer 64. The rise in temperature, due to light absorption, affects the phase of the layer, changing them from solid to liquid, or from optically transparent to optically reflecting, refracting or scattering, thus making the whole limiter 60 partially transmitting. The intensity of the light exiting the limiter 6 at 4 is reduced from its original intensity. The optically transparent layer 10 can be made of polymeric material, such as polymethylmethacrylate, polyurethane, polycarbonate, polyvinylbutyral, epoxy resins, thiol-ene based resins, optical adhesives, glass, spin-on glass and sol-gel materials. The phase-changing particles in the layer 12 are made of, e.g., 1-100 nm particles of at least one material selected from the group consisting of the elements Antimony, Bismuth, Cadmium, Lead, Tin and Indium and low-melting-point alloys of two or more of these elements. One example is InSn alloys. The patterning of the layer 64 can be used to manufacture gratings or planar lenses based on index of refraction change or phase change of material 64.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. An optical limiter comprising a glass backing, a glass cover, and a layer of a phase changing material placed between said glass backing and said glass cover, the phase changing material comprising a transparent matrix having embedded particles of material that changes its optical properties due to temperature induced reversible phase change of said material from solid to liquid in response to light impinging on said matrix, said material having a solid phase in which said material is optically transparent, and a liquid phase in which said material is optically reflecting, refracting or scattering so that it limits the optical power transmitted through said matrix.

2. The optical power limiter of claim 1, wherein said layer of a phase changing material is patterned in the micro/nanoscale.

3. The optical power limiter of claim 1, wherein said phase changing material is at least one material selected from the group consisting of the elements Antimony, Bismuth, Cadmium, Lead, Tin and Indium and low-melting-point alloys of two or more of said elements.

4. The optical power limiter of claim 1, wherein said optical limiter comprises two or more layers of phase changing materials in a stack configuration, each of said phase changing materials having a unique melting temperature.

5. The optical power limiter of claim 4 which includes optically transparent inter-layers separating said layers of phase changing materials.

6. The optical power limiter of claim 5, wherein said optically transparent inter-layers comprise at least one material selected from the group consisting of polymeric material, glass, spin-on glass and a sol-gel material.

7. The optical power limiter of claim 6, wherein said polymeric material is at least one material selected from the group consisting of polymethylmethacrylate, polyurethane, polycarbonate, polyvinylbutyral, epoxy resins, thiol-ene-based resins, and optical adhesives.

8. The optical power limiter of claim 1 which includes an optically transparent interlayer material that contains an infrared-absorbing dye.

9. The optical power limiter of claim 1 which includes a layer of a composite material comprising a matrix material and dispersed micro/nanoparticles of a phase changing material that changes its properties from transparent to mat or scattering.

10. The optical power limiter of claim 9, wherein said layer of composite material is patterned in the micro/nanoscale range.

11. The optical power limiter of claim 1 which includes a layer of a composite material comprising a matrix material and dispersed micro/nanoparticles of a phase changing material that changes its properties from transparent to refractive.

12. The optical power limiter of claim 1 which includes two or more phase changing materials dispersed as micro/nanoparticles in a matrix system, each of said phase changing materials having a unique melting temperature.

13. The optical power limiter of claim 1 which includes optically transparent interlayers of at least one material selected from the group consisting of polymeric material, glass, spin-on glass and sol-gel material.

14. The optical power limiter of claim 1 which includes an optically transparent interlayer polymeric material selected from the group consisting of polymethylmethacrylate, polyurethane, polycarbonate, polyvinylbutyral, epoxy resins, thiol-ene based resins and optical adhesives.

15. An optical power-limiting method for limiting optical power transmission, said method comprising disposing within the path of light whose optical power transmission is to be limited, a layer of a phase-changing material comprising a normally transparent matrix having embedded particles of material that reversibly changes its optical properties due to temperature induced reversible phase change of said material in response to said light impinging on said matrix, said material having a solid phase in which said material is optically transparent when the optical power of impinging light is below a predetermined threshold, and a liquid phase in which said material is optically reflecting, refracting or scattering so that it limits the optical power transmitted through said matrix when the optical power of impinging light is above said threshold, and returning to said solid phase when the optical power of impinging light returns below said threshold.

16. The optical power-limiting method of claim 15 in which said embedded particles are at least one material selected from the group consisting of antimony, bismuth, cadmium, lead, tin, indium and alloys of at least two of these elements.

17. The optical power-limiting method of claim 15 in which said embedded particles have a size within the range from about 1 to about 100 nanometers.

\* \* \* \* \*